(12) United States Patent
Rankov et al.

(10) Patent No.: US 8,874,539 B2
(45) Date of Patent: *Oct. 28, 2014

(54) OBJECT IDENTITY AND ADDRESSABILITY

(71) Applicant: EMC Corporation, Hopkinton, MA (US)

(72) Inventors: Alex Rankov, Danville, CA (US); Craig Randall, Pleasanton, CA (US); Oleg Bivol, Toronto (CA); Meir Amiel, Pleasanton, CA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/848,903

(22) Filed: Mar. 22, 2013

(65) Prior Publication Data
US 2013/0297637 A1    Nov. 7, 2013

Related U.S. Application Data

(63) Continuation of application No. 11/823,527, filed on Jun. 28, 2007, now Pat. No. 8,433,699.

(51) Int. Cl.
*G06F 17/30* (2006.01)
(52) U.S. Cl.
CPC ...... *G06F 17/30386* (2013.01); *G06F 17/3056* (2013.01)
USPC .......................................... 707/705; 707/706

(58) Field of Classification Search
USPC .................................................. 707/705, 706
See application file for complete search history.

(56) References Cited

U.S. PATENT DOCUMENTS

| | | | |
|---|---|---|---|
| 5,929,848 A * | 7/1999 | Albukerk et al. | 715/700 |
| 6,161,108 A * | 12/2000 | Ukigawa et al. | 1/1 |
| 8,041,560 B2 * | 10/2011 | Hermansen et al. | 704/10 |
| 8,433,699 B1 * | 4/2013 | Rankov et al. | 707/707 |
| 2002/0103848 A1 * | 8/2002 | Giacomini et al. | 709/200 |
| 2006/0288285 A1 * | 12/2006 | Lai et al. | 715/708 |
| 2010/0161558 A1 * | 6/2010 | Goldberg et al. | 707/639 |
| 2012/0191716 A1 * | 7/2012 | Omoigui | 707/740 |

* cited by examiner

*Primary Examiner* — Baoquoc N To
(74) *Attorney, Agent, or Firm* — Van Pelt, Yi & James LLP

(57) ABSTRACT

Identifying a repository object is disclosed. An object identifying information usable to identify a repository object with respect to which an operation is desired to be performed is included in a request not specific to any one manner of identifying objects. The request is sent to a node associated with a repository in which the repository object is or will be stored. At the receiving end, e.g., a content server, the object identifying information included in the request is used to identify the repository object with respect to which the operation is desired to be performed, for example to retrieve the repository object.

20 Claims, 5 Drawing Sheets

OBJECT IDENTITY AND ADDRESSABILITY

CROSS REFERENCE TO OTHER APPLICATIONS

This application is a continuation of co-pending U.S. patent application Ser. No. 11/823,527, entitled OBJECT IDENTITY AND ADDRESSABILITY filed Jun. 28, 2007 which is incorporated herein by reference for all purposes.

BACKGROUND OF THE INVENTION

An object stored in a content management system or other repository typically has an object identifier, e.g., a 12-digit string, which identifies the object uniquely within the repository. The object identifier may be used, for example, to retrieve and/or perform other operations with respect to the object, e.g., to update or delete an object. In some cases, however, such as where a remote client may need to retrieve or perform another operation with respect to an object in a repository, the object identifier may not be known to the client or other requesting entity. However, the client or other requesting entity may know other information usable to identify the object.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enabling a requesting client to use, in a request not specific to any particular manner of identifying an object stored in a repository, one of a plurality of supported ways of identifying the object is disclosed. In some embodiments, the client includes in the request an object identity data that identifies a repository in which the object is located, e.g., by repository name, and which includes an object identity type data indicating the manner in which the repository object is identified and a corresponding object identifying data that identifies the repository object in the manner indicated in the request. In some embodiments, the manner of identification is indicated by selecting and including in the request an object identity or related object of a type that corresponds to the manner used in the request to identify the repository object.

Figure 1:
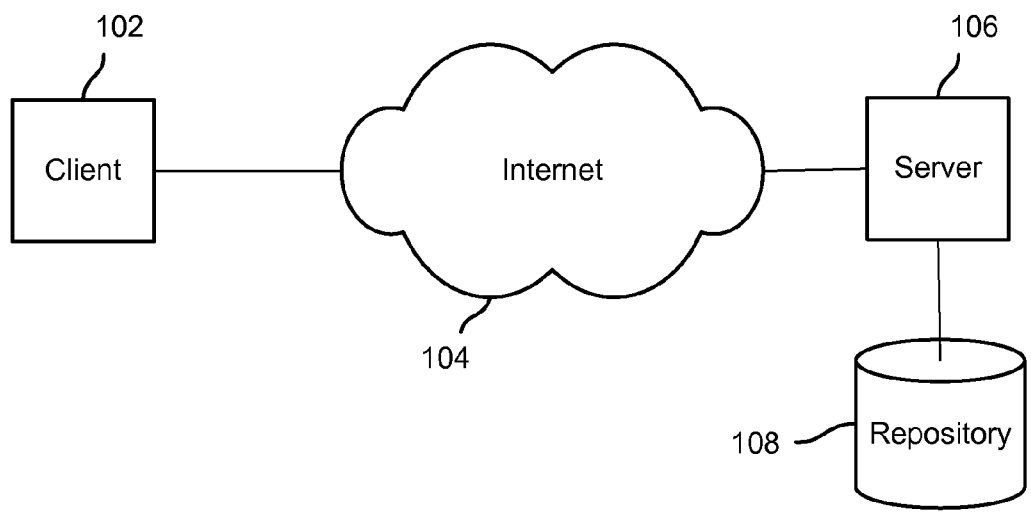
FIG. 1 is a block diagram illustrating an embodiment of a network environment.

FIG. 1 is a block diagram illustrating an embodiment of a network environment. A client 102 communicates via the Internet (and/or one or more other networks) 104 with a server 106 associated with a repository 108. In various embodiments, repository 108 may be one of a plurality of repositories associated with server 106. Each repository 108 is identified in various embodiments by a repository name and/or other identifier. Client 102 is configured, e.g., by installing and running a client-side software application, to perform and/or have occasion to request that server 106 perform operations on objects stored in repository 108, sometimes referred to herein as "repository objects" to distinguish them from other objects described herein. For example, the client 102 may have performed a computation and/or received a user input requiring that a repository object stored in repository 108 be updated, or the client may need to retrieve, e.g., for display, editing, or other processing at the client, content comprising or otherwise associated with a repository object stored in repository 108.

As noted above, typically an object stored in a repository such as repository 108 has assigned to it an object identifier, such as 12-digit or other string, which identifies the object uniquely in the repository. In some cases, a client such as client 102 may not know the object identifier by which the object is known in the repository. However, the client may know other information that is or may be usable to identify the required object. For example, the client (or other requesting entity) may know a document or other object name and a logical path associated with it at the repository, e.g., a path identifying the object as being associated at and/or by the repository with a particular cabinet, folder, and/or other logical storage location or structure. Or, the client may know one or more values (e.g., properties) associated with the object that may be usable to find the object in the repository using database functionality and/or techniques, e.g., by treating at least selected ones of the values as object keys. In addition, the client may be able to identify the object by "qualification", i.e., by defining a query, e.g., in a query language associated with and/or supported by repository, such as the Document Query Language (DQL) of the EMC Documentum™ content management system, that the client believes will be satisfied uniquely by the desired object (i.e., one and only one object satisfying the query will be found). It would be possible to define for each type of request that a client may make of a content server and/or associated repository multiple versions of the request, e.g., one for each manner of identifying a repository object that is supported by the repository and/or associated server. To avoid such multiplicity of requests, decoupling repository object identification and in particular the manner of object identification used by a client or other requesting entity from the request itself is disclosed.

Figure 2:
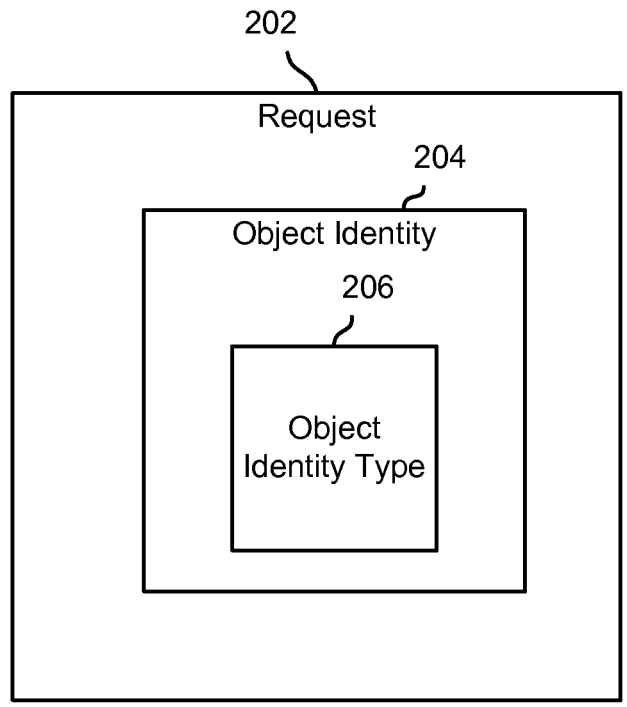
FIG. 2 is a block diagram illustrating an embodiment of a request associated with a repository object.

FIG. 2 is a block diagram illustrating an embodiment of a request associated with a repository object. In the example shown, a request 202 includes an object identity object 204, which in turn includes an object identity type object 206. In some embodiments, the request 202 is generic in the sense that it can be used regardless of the manner in which the repository object to which the request pertains is to be identified. The client uses the generic request 202 and includes in object identity object 204 a repository name or other identifier of the repository in which the applicable repository object is stored and an object identity type object of the appropriate type, i.e., one of a type corresponding to the manner in which the repository object is to be identified. In various embodiments, the options for the object identity type object include one or more of an object id type, an object path type, an object key type, and an object qualification type. Each object identity type object is configured to contain a corresponding set of object identifying data usable by the server and/or repository to locate the object with respect to which the request is desired to be performed. For example, an object id type object would store an object identifier, such as a 12-digit or other string, which uniquely identifies the object to the repository. Similarly, an object path type object stores a logical path identifying a logical storage location at or otherwise associated with the repository and a name associated with the object at that logical location. Likewise, an object key type object stores object one or more object properties and an object qualification stores a DQL or other query usable (or at least believed by the client to be usable) to find the repository object in the repository. In some alternative embodiments, the manner in which the repository object is being identified is indicated other than by the type of object identity type object used, e.g., by setting a flag or other value of the request and/or object identity object.

Figure 3:
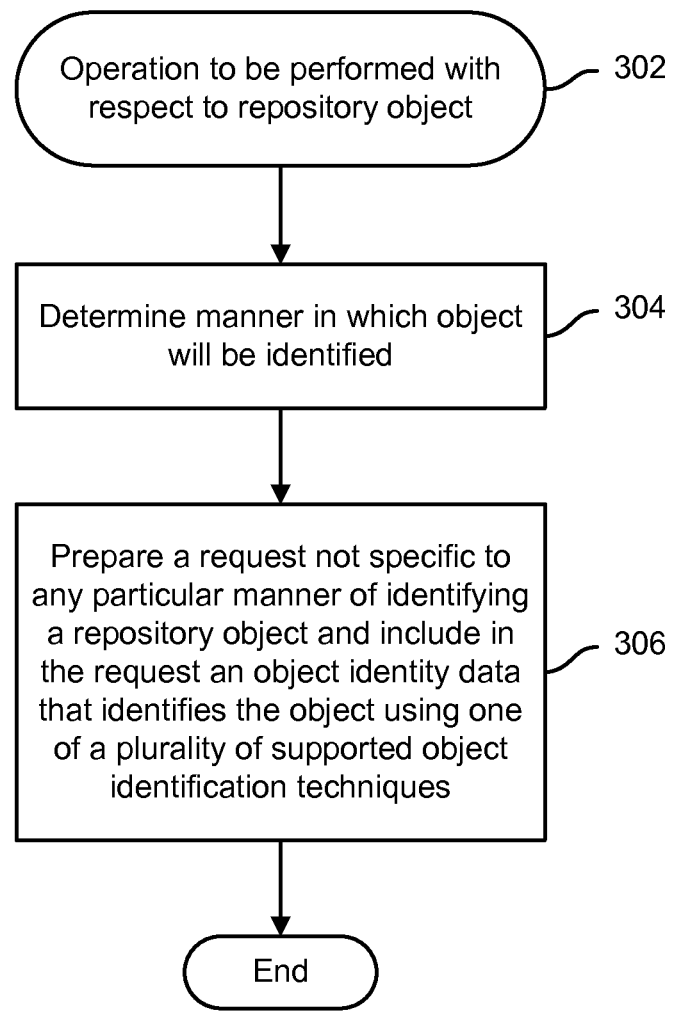
FIG. 3 is a flow chart illustrating an embodiment of a process for preparing a request with respect to an object in a repository.

FIG. 3 is a flow chart illustrating an embodiment of a process for preparing a request with respect to an object in a repository. In some embodiments the process of FIG. 3 is implemented by a client such as client 102 of FIG. 1. In the example shown, on receiving an indication that an operation is to be performed with respect to an object stored in a repository (302), it is determined how the repository object will be identified in the request (304). A request that is not specific to any particular manner of identifying a repository object and which includes an object identity data that identifies the object using one of a plurality of supported object identification techniques is prepared (306). For example, a request such as request 202 is prepared, and object identifying data such as object identity object 204, object identity type object 206, and object repository name are included in the request.

Figure 4:
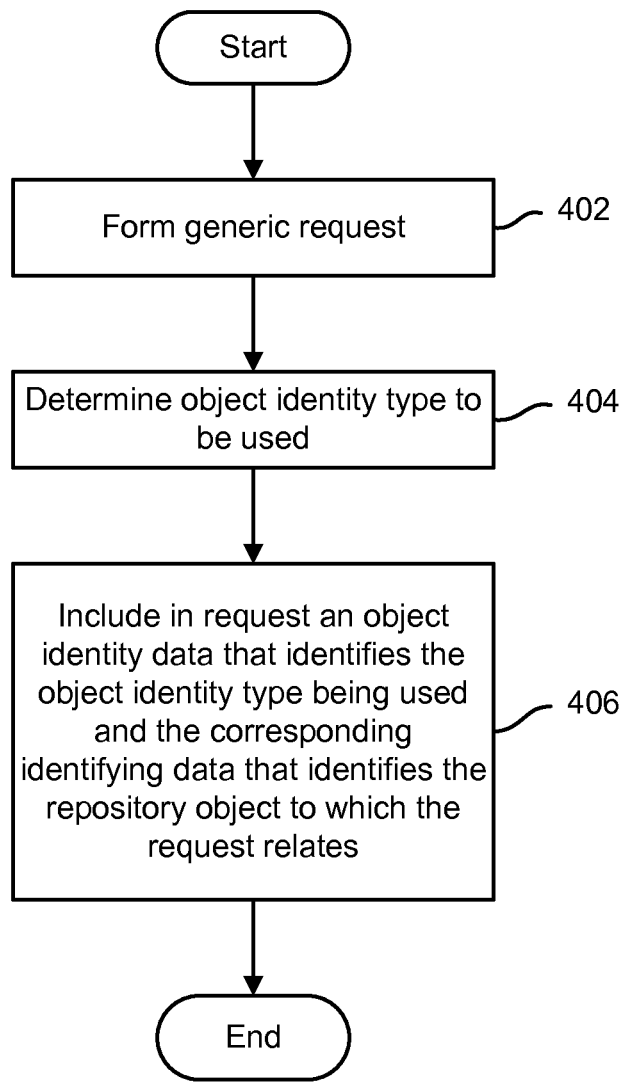
FIG. 4 is a flow chart illustrating an embodiment of a process for preparing a request.

FIG. 4 is a flow chart illustrating an embodiment of a process for preparing a request. In some embodiments the process of FIG. 4 is used to implement 306 of FIG. 3. An instance of a generic request of the request type desired is created (402). A manner in which the repository object will be identified in the request is determined (404) and an object identity data that identifies the object identity type being used and the corresponding identifying data that identifies in the manner indicated the repository object to which the request relates are included in the request (406), e.g., by instantiating and including in/with the request an object identity object and an object identity type object of the appropriate type.

Figure 5:
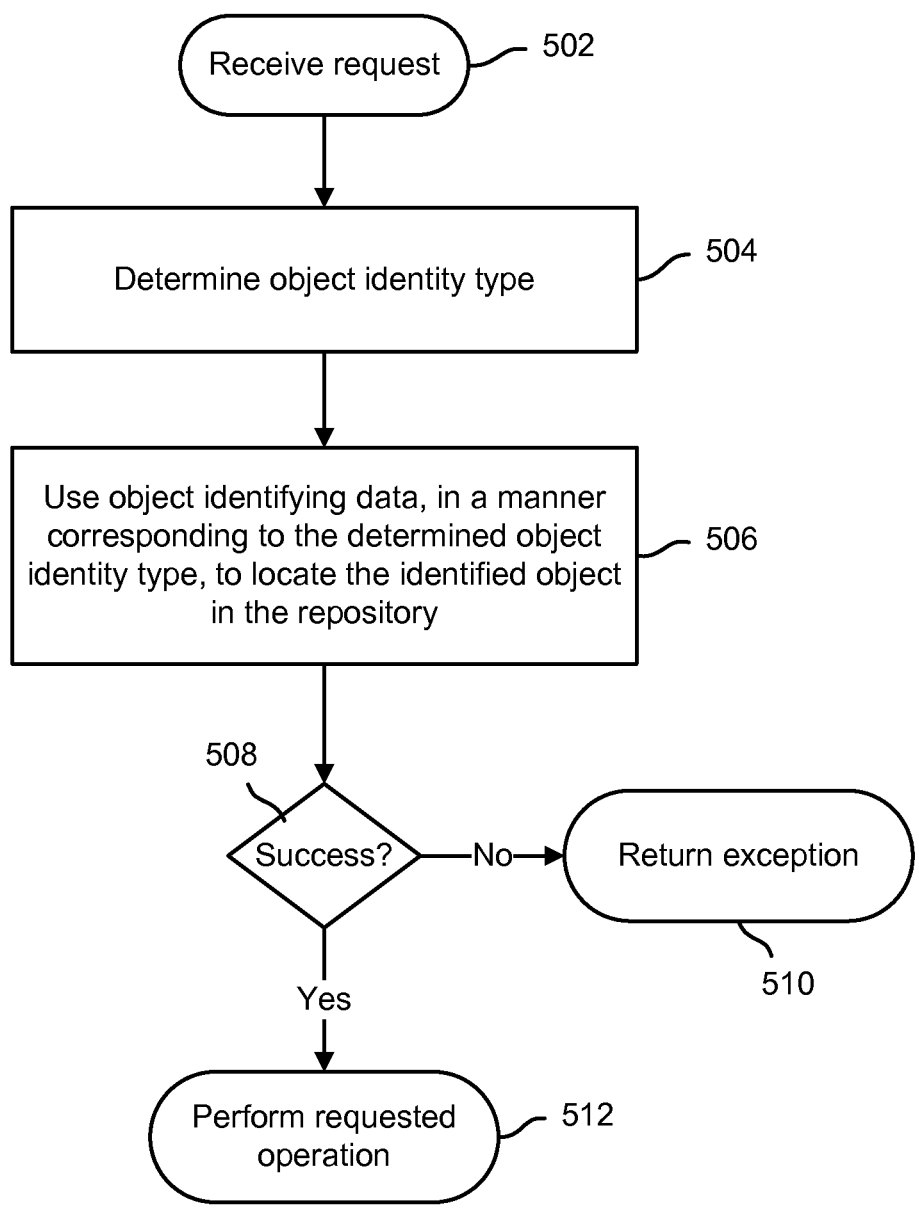
FIG. 5 is a flow chart illustrating an embodiment of a process for processing a request.

FIG. 5 is a flow chart illustrating an embodiment of a process for processing a request. In some embodiments, the process of FIG. 5 is implemented at a server such as server 106 of FIG. 1. In the example shown, upon receiving a request (502) it is determined how a repository object to which the request relates is identified in the request (504). In some embodiments, the manner of identification is inferred from the type of an object identity and/or object identity type object included in and/or otherwise associated with the request. In some embodiments, the manner of identification is inferred from object identifying data included in the request. For example, if a valid object identifier is received, it is determined that the object id manner of identifying the object has been used. Once the manner in which the repository object is identified in the request has been determined, object identifying data including in the request is processed, in a manner corresponding to the determined manner of identifying the repository object, to locate the object in the repository (506). For example, if a qualification is provided, the query is executed against the repository to find the repository object to which the request relates. If the repository object is located successfully (508), the requested operation is performed (512). Otherwise, for example if no object or more than one object is/are found (508), an exception is returned (510).

Decoupling object identification techniques from requests as described herein provides flexibility and scalability, enabling for example a developer of a client-side application to use whichever repository object identification technique(s) make the most sense in a given circumstance, determined for example based on what sort of identifying information the client has available to it. The approach described herein may reduce communication between the client and server by avoiding the need for the client to send, for example, queries to the server to determine an object identifier prior to being able to prepare and send a request relating to a repository object for which the object identifier is not (yet) known to the client.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, at a node associated with a repository, a request including object identifying information;
process the request to determine a type associated with the object identifying information;
determine a manner of identifying a repository object associated with the request by mapping the type associated with the object identifying information to the manner included in a plurality of manners supported by the node; and
use the object identifying information included in the request in the determined manner to retrieve the repository object from the repository; and
a memory coupled to the processor and configured to store the request.

2. The system as recited in claim 1, wherein the object identifying information comprises an object id associated with the repository object.

3. The system as recited in claim 1, wherein the object identifying information comprises an object key associated with the repository object.

4. The system as recited in claim 1, wherein the object identifying information comprises a logical path or other logical location with which the repository object is associated at a repository.

5. The system as recited in claim 1, wherein the object identifying information comprises an object path type associated with the repository object.

6. The system as recited in claim 1, wherein the object identifying information comprises a query to which the repository object is responsive.

7. The system as recited in claim 1, wherein the object identifying information comprises a repository name of a repository with which the repository object is associated.

8. The system as recited in claim 1, wherein to determine the manner the processor is to map an object identity type object included in the request to the manner of identifying the repository object.

9. The system as recited in claim 1, wherein to determine the manner the processor is to perform a validation on at least a portion of the object identifying information.

10. The system as recited in claim 1, wherein using the object identifying information included in the request includes locating the repository object based at least in part on the object identifying information.

11. A method, comprising:
receiving, at a node associated with a repository, a request including object identifying information;
processing the request to determine a type associated with the object identifying information;
determining a manner of identifying a repository object associated with the request by mapping the type associated with the object identifying information to the manner included in a plurality of manners supported by the node; and
using the object identifying information included in the request in the determined manner to retrieve the repository object from the repository.

12. The method as recited in claim 11, wherein the object identifying information comprises an object id associated with the repository object.

13. The method as recited in claim 11, wherein the object identifying information comprises an object key associated with the repository object.

14. The method as recited in claim 11, wherein the object identifying information comprises a logical path or other logical location with which the repository object is associated at a repository.

15. The method as recited in claim 11, wherein the object identifying information comprises an object path type associated with the repository object.

16. The method as recited in claim 11, wherein the object identifying information comprises a query to which the repository object is responsive.

17. The method as recited in claim 11, wherein determining the manner includes mapping an object identity type object included in the request to the manner of identifying the repository object.

18. The method as recited in claim 11, wherein determining the manner includes performing a validation on at least a portion of the object identifying information.

19. The method as recited in claim 11, wherein using the object identifying information included in the request includes locating the repository object based at least in part on the object identifying information.

20. A computer program product, the computer program product being embodied in non-transitory computer-readable medium and comprising computer instructions for:
receiving, at a node associated with a repository, a request including object identifying information;
processing the request to determine a type associated with the object identifying information;
determining a manner of identifying a repository object associated with the request by mapping the type associated with the object identifying information to the manner included in a plurality of manners supported by the node; and
using the object identifying information included in the request in the determined manner to retrieve the repository object from the repository.

* * * * *